Figure 1:
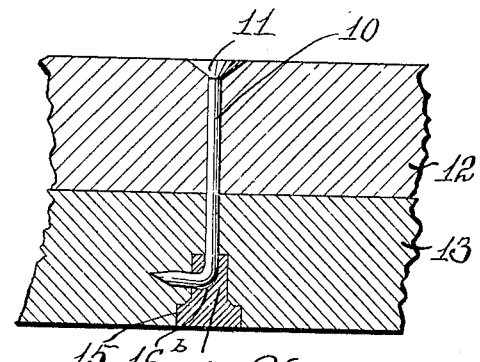

F. C. A. SCHLOTTMANN.
CLENCHING NAIL LOCK.
APPLICATION FILED OCT. 22, 1908.

926,140.

Patented June 29, 1909.

Witnesses
Frank L. Stubbs
Ralph Faucette

Frederick C. A. Schlottmann, Inventor
By his Attorney
W. P. Hutchinson

THE NORRIS PETERS CO., WASHINGTON, D. C.

UNITED STATES PATENT OFFICE.

FREDERICK C. A. SCHLOTTMANN, OF NEW YORK, N. Y.

CLENCHING-NAIL LOCK.

No. 926,140.  Specification of Letters Patent.  Patented June 29, 1909.

Application filed October 22, 1908.  Serial No. 459,098.

*To all whom it may concern:*

Be it known that I, FREDERICK C. A. SCHLOTTMANN, of the city of New York, county of Kings, and State of New York, have invented a new and useful Improvement in Clenching-Nail Locks, of which the following is a full, clear, and exact description.

My invention relates to improvements in clenching nail locks, and the object of my invention is to produce a simple device which is not much more expensive than an ordinary nail, but which is especially adapted to boat building and to fasten boards, timbers, or other things together in an absolutely solid manner.

My invention besides providing for clenching the nail and thus securing the parts together, is also adapted to provide means for automatically clenching the nail and drawing the parts into a close union, by simply driving the nail through the nail lock. In carrying out this idea, I provide a malleable nail like the ordinary wire nail, but preferably with a finished head, and in connection with the nail I employ a socket member which has a curved bore extending from the inner end of the said member longitudinally and then outward through the side of the said socket member, so that when the said socket member is in place to receive the point of the nail, the latter will be deflected to one side and curved so as to slightly return upon itself, thereby drawing the two parts united by the nail into a very close connection.

This clenching nail is particularly adapted for use in nailing parts to be brought together, as such construction must necessarily be very strong. The device can also be used in nailing the boards of a door together, or in fact for uniting any two wooden or other parts which are intended to be held more firmly than they can be by the ordinary nail.

The device is better than a screw for the reason that the nail passes through the nail lock and gives it a better hold, whereas the screw thread may work loose, although in one form of my device I can use a screw thread which in particular should be used for fastening in lapped plank boats.

In carrying out my invention I arrange to counter-sink the socket member, and I can counter-sink the nail head and then cover it with a suitable plug so as to make a very handsome finish and still have the two parts held snug by the nail.

Reference is to be had to the accompanying drawing forming a part of this specification, in which similar reference characters indicate corresponding parts in all the views.

Figure 2:
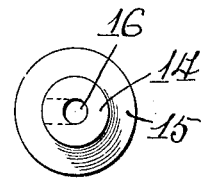
Figure 3:
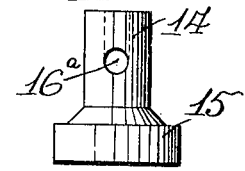

Figure 1 is a sectional elevation of my improved device, showing the same applied to two connected planks. Fig. 2 is an inside end view of the socket member. Fig. 3 is a side elevation of the socket member, and Fig. 4 is a view similar to Fig. 1, but showing a different type of nail head.

Figure 4:
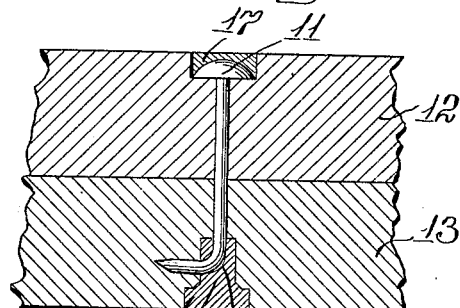

The nail 10 can be an ordinary flexible and malleable iron nail having a head 11 which can be of the form shown in Fig. 4, or can be any suitable nail head. This nail is adapted to hold two connected planks 12 and 13, or other similar things in an exceedingly close union. To this end the nail is adapted to enter a socket member 14 which is placed in line with the nail, and to provide for the proper alinement, it is preferable to bore a hole through the parts 12 and 13, one end of the hole being enlarged to receive the socket member 14 while the other part receives the nail 10. The socket member 14 has preferably a head 15 forming a reduced portion beyond the head so that it can be counter-sunk and held firmly in the part 13, but yet in such a way as to make a handsome finish. The member 14 has a longitudinal bore 16 in its reduced portion which, however, is curved as shown at 16$^b$, and leads out through the side of the member 14 as shown at 16$^a$, and the curvature of the bore is such as to provide the necessary clearance and to deflect the nail so that the point will return slightly upon itself, thus causing the nail when driven into the socket member to draw the two parts 12 and 13 very close together. This action is especially assisted through the medium of the intermediate portion, in the reduced portion of the socket, formed by the bore and which serves to effectually retain the parts together.

In Fig. 4 I have shown a structure similar to that illustrated in Fig. 1 but the nail head 11 is slightly different in shape, being flat on its inner side, and it is counter-sunk and covered by a suitable plug 17, so that the part 12 can be nicely finished.

Obviously the socket member can be given any desired external shape and the nail can also be given any desired form, the only essential thing being that the functions of the parts be preserved as specified.

Having thus fully described my invention, I claim as new and desire to secure by Letters Patent:—

1. A fastening device comprising a malleable nail provided with a suitable head and a socket-member having an enlarged head and a central bore adapted to receive said nail, said bore being deflected laterally through the side of the socket-member whereby said nail will be turned back upon itself.

2. A fastening device, comprising a nail and a socket-member having an enlarged head and reduced portion beyond the head, said socket member being also provided with a central and curved bore adapted to receive said nail extending from within the inner end of said socket member and leading out through the side thereof, within the reduced portion thereof.

FREDERICK C. A. SCHLOTTMANN.

Witnesses:
WARREN B. HUTCHINSON,
FRANK L. STUBBS.